Patented July 5, 1949

2,474,915

UNITED STATES PATENT OFFICE 2,474,915

ANTISTICKING SURFACE MATERIAL FOR FRUIT

Raymond E. Ramont, Los Angeles, Calif.

No Drawing. Original application April 27, 1946, Serial No. 665,432. Divided and this application July 16, 1946, Serial No. 683,977

2 Claims. (Cl. 99—103)

My invention relates to antisticking surfacing material for fruit and fruit handling equipment and is a division of my copending application, Serial No. 665,432, filed April 27, 1946. Included in the objects of my invention are:

First, to provide a material which, when employed as an ingredient in a fruit washing solution, produces a protective coating undetectable except for the fact that the surface of the fruit is rendered nonsticky;

Second, to provide a material which not only inhibits the stickiness of the fruit when washed, but also when the material is applied to conveyer belts and other apparatus which is contacted by the fruit, so conditions the surface that sticking of the fruit to the apparatus is materially reduced;

Third, to provide a protective surfacing for fruit and processing apparatus contacted thereby which is particularly suitable for dates, raisins and other fruit having high sugar content, particularly high sugar content on their surfaces; and Fourth, to provide a material of this class which does not introduce any characteristic flavor or which does not in any manner injure the fruit or alter its appearance, but instead tends to inhibit or minimize molding of the fruit.

My protective surfacing for fruit and fruit processing apparatus may be employed in two ways. Preferably both are used; that is, the fruit may be washed in a solution containing the material so that a thin coating of the material is applied over the fruit. In addition, or alternatively, the surfaces of the fruit handling equipment, particularly conveyer belts and similar devices may be covered or dressed with the material.

The material which I have found to be effective, and in fact, remarkably effective, is propylene glycol, N. F., and its formula may be expressed as follows:

Propylene glycol is a clear, colorless, practically odorless, slightly viscous material. While this material has been used in the food industry as well as in the cosmetic and pharmaceutical fields as a preservative, as a humectant, as a carrier or vehicle for flavors, as a softening agent and other kindred uses, its unique properties which I have discovered have not, apparently, been recognized heretofore.

I have discovered that propylene glycol is particularly effective in the processing of dates. The dates may be washed in a solution of proylene glycol and water; for example, the solution may comprise:

| | Percent |
|---|---|
| Propylene glycol | 5 to 25 |
| Water | 95 to 75 |

For particularly sticky or overripe dates I have found that the addition of ethyl alcohol is beneficial, particularly in that the amount of propylene glycol may be reduced and thus render the solution less expensive; for example, a satisfactory solution is as follows:

| | Percent |
|---|---|
| Ethyl alcohol | 50 |
| Water | 45 |
| Propylene glycol | 5 |

When dates are washed with the above solution and gently scrubbed, their surfaces are rendered nonsticky, but their appearance is not altered except that they appear exceptionally clean and attractive. Even if the most gentle scrubbing were attempted without the propylene glycol in the solution, the scrubbing brushes or whatever means is employed or used to clean the dates quickly become clogged with date particles and a large percentage of the dates are spoiled. Moreover, the dates which are spoiled are usually the riper and, hence, better flavored dates. Thus, propylene glycol is not only useful to prepare the surface of the date itself, but also by reason of its action on the cleaning apparatus eliminates clogging of the machinery. While the cleaning machinery may be maintained in proper condition by the washing solution, other handling equipment, such as conveyer belts and the like, which contacts the dates, either before cleaning or after cleaning, may best be protected by the use of pure propylene glycol applied thereto as a dressing.

Thus, it will be seen that propylene glycol is an effective surfacing material either coated on the fruit or on the apparatus contacted by the fruit or on both the fruit and the apparatus.

While the use of propylene glycol has been directed particularly to the cleaning of dates, it is obvious that this material may be used in the handling of other fruit; for example, raisins.

Having fully described my invention, it is to be understood that I do not wish to be limited to the details herein set forth, but my invention is of the full scope of the appended claims.

I claim:

1. A washing solution for fruit having high sugar content, comprising:

| | Percent |
|---|---|
| Propylene glycol | 5 |
| Water | 45 |
| Ethyl alcohol | 50 |

2. A washing solution for fruit having high sugar content, comprising:

| | Percent |
|---|---|
| Propylene glycol | 5 to 15 |
| Water | 45 to 55 |
| Ethyl alcohol | 50 to 30 |

RAYMOND E. RAMONT.

REFERENCES CITED

The following references are of record in the file of this patent:

Uses and Application of Chemicals by Gregory, vol. II, pages 276–7.